US012663241B2

(12) United States Patent
Hovanec et al.

(10) Patent No.: US 12,663,241 B2
(45) Date of Patent: Jun. 23, 2026

(54) BALLISTIC RESISTANT MATERIAL MADE OF MECHANICALLY ENTANGLED WOVEN FABRICS WITHOUT NONWOVEN FIBERS AND METHOD OF MAKING THEREOF

(71) Applicant: DUPONT SAFETY & CONSTRUCTION, INC., Wilmington, DE (US)

(72) Inventors: Joseph Hovanec, Richmond, VA (US); Scott Janco, Richmond, VA (US); Shekoufeh Shahkarami, Mississauga (CA); Kevin Mulcahy, Richmond, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 18/706,400

(22) PCT Filed: Nov. 2, 2022

(86) PCT No.: PCT/US2022/079140
§ 371 (c)(1),
(2) Date: May 1, 2024

(87) PCT Pub. No.: WO2023/191902
PCT Pub. Date: Oct. 5, 2023

(65) Prior Publication Data
US 2025/0012549 A1 Jan. 9, 2025

Related U.S. Application Data

(60) Provisional application No. 63/277,802, filed on Nov. 10, 2021.

(51) Int. Cl.
*F41H 5/04* (2006.01)
*B32B 5/02* (2006.01)
(Continued)

(52) U.S. Cl.
CPC ........... *F41H 5/0478* (2013.01); *B32B 5/024* (2013.01); *B32B 5/263* (2021.05); *B32B 7/09* (2019.01);
(Continued)

(58) Field of Classification Search
CPC ........... F41H 5/04; F41H 5/0485; B32B 7/09; B32B 5/263; B32B 5/024; B32B 2250/20; B32B 2307/54; B32B 2571/02
See application file for complete search history.

(56) References Cited

U.S. PATENT DOCUMENTS 2,045,586 A    6/1936 Crowley
3,094,511 A    6/1963 Hill et al.
(Continued)

FOREIGN PATENT DOCUMENTS

CN        111746061 A     3/2019
IN     2011DE00044 A      1/2011
(Continued)

OTHER PUBLICATIONS

International Search Report issued in International Application No. PCT/US2022/079140, issues on Nov. 16, 2023.
(Continued)

*Primary Examiner* — Joanna Pleszczynska
(74) *Attorney, Agent, or Firm* — Ram W. Sabnis

(57) ABSTRACT

A consolidated material and method for forming a consolidated material. The consolidated material comprises a plurality of woven fabric layers that are mechanically entangled together. The plurality of woven fabric layers comprise fibers. The plurality of woven fabric layers are mechanically entangled together with fibers of the plurality of woven fabric layers and without nonwoven fibers. At least some fibers of the plurality of woven fabric layers extend in the Z-direction perpendicular to the x-y plane of the plurality of
(Continued)

woven fabric layers. Methods for forming a consolidated material are also provided.

17 Claims, 3 Drawing Sheets

(51) Int. Cl.
    *B32B 5/26*      (2006.01)
    *B32B 7/09*      (2019.01)
(52) U.S. Cl.
    CPC ....... *B32B 2250/05* (2013.01); *B32B 2250/20* (2013.01); *B32B 2262/02* (2013.01); *B32B 2307/516* (2013.01); *B32B 2307/54* (2013.01); *B32B 2307/718* (2013.01); *B32B 2307/72* (2013.01); *B32B 2307/7376* (2023.05); *B32B 2571/02* (2013.01)

(56) References Cited

U.S. PATENT DOCUMENTS

| | | | |
|---|---|---|---|
| 3,354,127 | A | 11/1967 | Hill et al. |
| 3,673,143 | A | 6/1972 | Bair et al. |
| 3,767,756 | A | 10/1973 | Blades |
| 3,819,587 | A | 6/1974 | Kwoleck |
| 3,869,429 | A | 3/1975 | Blades |
| 3,869,430 | A | 3/1975 | Blades |
| 4,018,735 | A | 4/1977 | Nakagawa et al. |
| 4,172,938 | A | 10/1979 | Mera et al. |
| 4,228,118 | A | 10/1980 | Wu et al. |
| 4,276,348 | A | 6/1981 | Wu et al. |
| 4,457,985 | A | 7/1984 | Harpell et al. |
| 4,478,083 | A | 10/1984 | Hassler et al. |
| 4,533,693 | A | 8/1985 | Wolfe et al. |
| 4,703,103 | A | 10/1987 | Wolfe et al. |
| 4,772,687 | A | 9/1988 | Henk |
| 4,847,350 | A | 7/1989 | Harris et al. |
| 5,089,591 | A | 2/1992 | Gregory et al. |
| 5,276,128 | A | 1/1994 | Rosenberg et al. |
| 5,674,969 | A | 10/1997 | Sikkema et al. |
| 6,051,313 | A | 4/2000 | Olry et al. |
| 6,846,545 | B2 | 1/2005 | Thomas |
| 7,101,818 | B2 | 9/2006 | Price et al. |
| 7,241,709 | B2 | 7/2007 | Chious et al. |
| 7,498,282 | B2 | 3/2009 | Patel et al. |
| 7,631,405 | B2 | 12/2009 | Ritter et al. |
| 7,700,503 | B2 | 4/2010 | Thomas, Jr. |
| 8,015,617 | B1 | 9/2011 | Carbajal et al. |
| 8,080,486 | B1 | 12/2011 | Bhatnagar et al. |
| 8,236,711 | B1 | 8/2012 | Wang |
| 9,169,581 | B2 | 10/2015 | Tam et al. |
| 9,850,598 | B2 | 12/2017 | Shahkarami |
| 10,272,640 | B2 | 4/2019 | Bhatnagar et al. |
| 10,550,500 | B2 | 2/2020 | Erb, Jr. et al. |
| 11,390,771 | B2 | 7/2022 | Johnson |
| 2012/0312151 | A1 | 12/2012 | Patel |
| 2014/0206248 | A1 | 7/2014 | Vito et al. |
| 2014/0272267 | A1 | 9/2014 | Bradley et al. |
| 2014/0357834 | A1 | 12/2014 | Newton et al. |
| 2016/0202024 | A1 | 7/2016 | Gravel et al. |
| 2017/0191803 | A1 | 7/2017 | Price et al. |
| 2018/0363183 | A1 | 12/2018 | Jarrard |
| 2020/0025530 | A1 | 1/2020 | Gravel et al. |
| 2020/0103205 | A1 | 4/2020 | Citterio et al. |
| 2020/0131676 | A1 | 4/2020 | Erb, Jr. et al. |

FOREIGN PATENT DOCUMENTS

| | | |
|---|---|---|
| JP | 60-047922 B2 | 10/1985 |
| JP | 64-008732 A | 2/1989 |
| KR | 10-1589786 B1 | 6/2012 |
| WO | 2008061668 A1 | 5/2008 |
| WO | 2014197039 | 12/2014 |

OTHER PUBLICATIONS

Black et al., Fibre-Forming Aromatic Polyamides, Science and Technology, vol. 2, p. 297, Interscience Publishers, 1968.

Sugak et al., Fabrication of fibres from sulfuric acid solutions of copolyamides containing polyamide—Benzimidazole units and their heat treatment, Fibre Chemistry vol. 31, No. 1, 1999.

Cliff, Encyclopedia of Textiles, Doric Publishing Company, Second edition, 1973, 5 pgs.

Ajmeri, Development in nonwoven as geotextiles, Advances in Technical Nonwovens, pp. 340-363, 2016.

Wagner, High-Performance Woven and Non-woven Ballistic Materials for Flexible Vests, 9 Pgs.

Thomas et al., Needle-Punched Non-Woven for High Fragment Protection, 9 pgs.

Mao, Nonwoven Fabric Filters, Advances in Technical Nonwovens, Elsevier, 2016, 38 pgs.

Kiekens, et al., Non-Wovens from Cotton Fibres for Absorbent Products Obtained by the Needle-Punching Process, Autex Research Journal, vol. 2, No. 4, 9 pgs, 2002.

BALLISTIC RESISTANT MATERIAL MADE OF MECHANICALLY ENTANGLED WOVEN FABRICS WITHOUT NONWOVEN FIBERS AND METHOD OF MAKING THEREOF

FIELD OF THE INVENTION

Disclosed embodiments relate generally to ballistic resistant materials, and more particularly, to ballistic resistant materials made of mechanically entangled woven fabrics without nonwoven fibers, and methods for manufacturing such materials.

BACKGROUND

Mechanically entangling woven fabrics together using nonwoven fibers, e.g., needle punching, to create ballistic resistant materials is well known in the art. It involves mechanically driving nonwoven fibers through woven fabrics via mechanical instruments such as barbed needles, water jets, air jets, etc. The mechanical instruments repeatedly penetrate through the woven fabrics and drive the nonwoven fibers through the woven fabrics so that the nonwoven fibers are intertwined and mechanically entangled with the fibers of the woven fabrics; thereby, mechanically consolidating the woven fabrics. See, for example, U.S. Pat. Nos. 7,101,818, and 7,631,405, and U.S. Pat. Publ. Nos. 2017/0191803, and 2020/0025530, which describe ballistic resistant materials and methods in which the fibers of nonwoven materials are mechanically entangled in the interstices of the woven fabric materials to reinforce the woven fabric materials and to form a consolidated multi-layer ballistic resistant material.

The nonwoven material used to form mechanically entangled ballistic resistant materials, however, creates additional weight that is undesired. For instance, nonwoven material and the nonwoven fibers therein generally do not offer ballistic performance benefits themselves and are considered "parasitic weight" within mechanically entangled ballistic resistant materials. Weight is a key component for ballistic resistant materials because the weight of ballistic applications (e.g., vest, helmet, etc.) contributes to and results in fatigue to the wearer of the ballistic applications after prolonged use. Weight also affects the performance and sustainability of certain ballistic applications such as helicopters and other aerial vehicles wherein ballistic resistant materials are used. Thus, reducing weight while maintaining or improving performance is desirable. In addition, when compared with woven materials, nonwoven materials absorb a greater amount of liquid (e.g., water, sweat, etc.), which is undesired in ballistic applications.

Accordingly, there is a need and desire for a mechanically entangled ballistic resistant material with reduced weight and reduced liquid absorption having the same or improved ballistic performance, and that is more efficient to manufacture.

SUMMARY

In one aspect, the present disclosure provides a consolidated material. The consolidated material comprises a plurality of woven fabric layers that are mechanically entangled together. The plurality of woven fabric layers comprise fibers. The plurality of woven fabric layers are mechanically entangled together with fibers of the plurality of woven fabric layers and without nonwoven fibers. At least some fibers of the plurality of woven fabric layers extend in the Z-direction perpendicular to the x-y plane of the plurality of woven fabric layers.

In another aspect, the present disclosure provides a consolidated material. The consolidated material comprises two or more woven fabric layers that are mechanically entangled together without nonwoven fibers. Some fibers of at least one woven fabric layer of the two or more woven fabric layers extend in the Z-direction into at least one other woven fabric layer of the two or more woven fabric layers.

In another aspect, the present disclosure provides a method of forming a consolidated material. The method of forming a consolidated material comprises mechanically entangling two or more woven fabric layers together without the use of nonwoven fibers to form a consolidated material.

In one embodiment, the method of forming a consolidated material further comprises arranging the two or more woven fabric layers in a stack prior to mechanically entangling the two or more woven fabric layers. In another embodiment, the method of forming a consolidated material further comprises heat treating and calendaring the consolidated material. In another embodiment, the method of forming a consolidated material further comprises applying one or more secondary processing steps to the consolidated material.

In another aspect, a method of forming a consolidated material comprises mechanically entangling a plurality of woven fabric layers together to form a consolidated material. The plurality of woven fabric layers comprise fibers. The plurality of woven fabric layers are mechanically entangled together with fibers of the plurality of woven fabric layers and without nonwoven fibers. At least some fibers of the plurality of woven fabric layers extend in the Z-direction perpendicular to the x-y plane of the plurality of woven fabric layers.

In one embodiment, the method of forming a consolidated material further comprises arranging the plurality of woven fabric layers together in a stack prior to mechanically entangling the plurality of woven fabric layers together. In another embodiment, the method of forming a consolidated material further comprises heat treating and calendaring the consolidated material. In another embodiment, the method of forming a consolidated material further comprises applying one or more secondary processing steps to the consolidated material.

DETAILED DESCRIPTION

Figure 1:
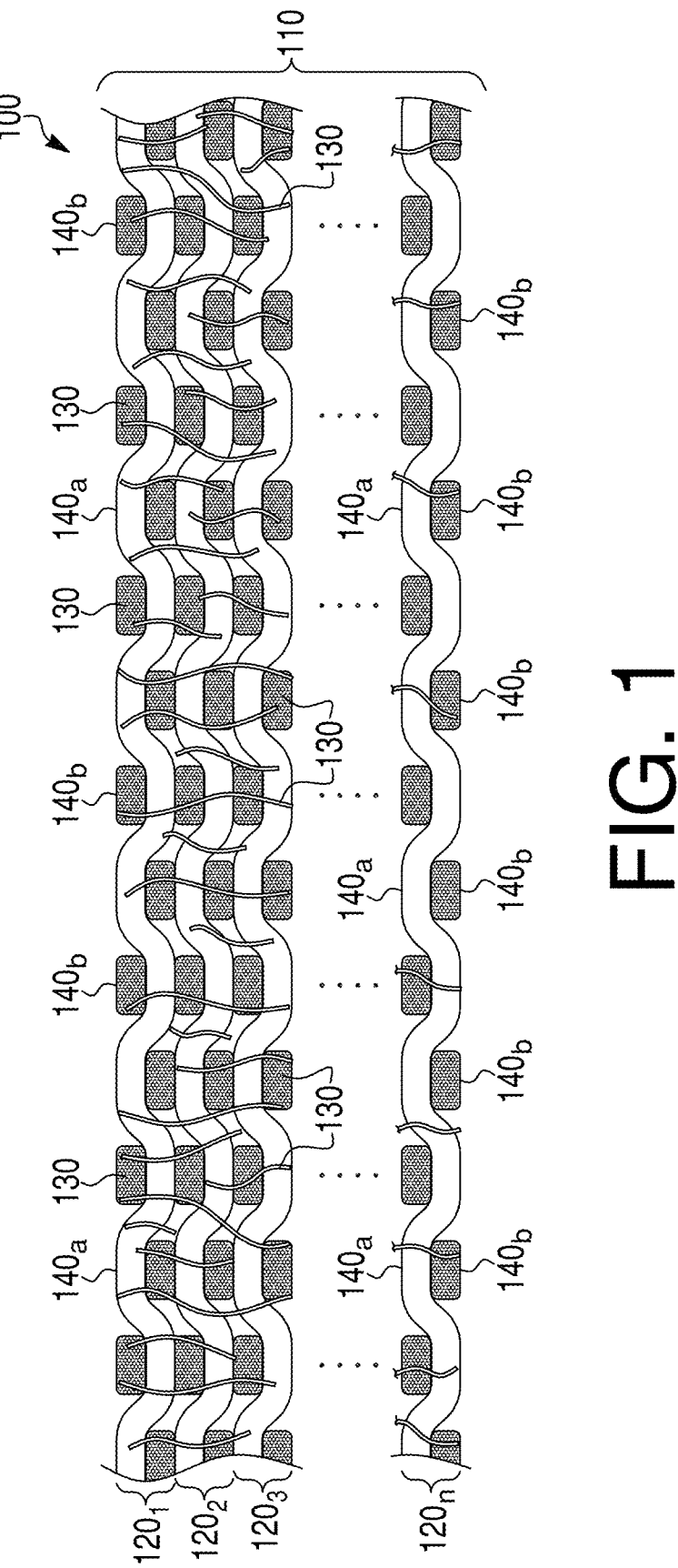
FIG. 1 is a cross-sectional front view of a ballistic resistant material according to an exemplary embodiment.

In the following detailed description, reference is made to the accompanying drawings which form a part hereof, and which illustrate exemplary embodiments of the invention. These embodiments are described in sufficient detail to enable those of ordinary skill in the art to make and use them. It is also understood that structural, logical, or procedural changes may be made to the exemplary embodiments disclosed herein without departing from the spirit or scope of the invention.

As used herein, "needle-consolidating" refers to the process of consolidating woven fabrics together with needles and without the use of nonwoven fibers by pressing barbed needles through woven fabrics and withdrawing them to mechanically entangle the fibers of the woven fabrics to form a consolidated material.

As used herein, "fiber" is an elongate body having a length dimension that is much greater than its transverse dimensions of width and thickness. The term fiber includes monofilament, multifilament, ribbon, strip, staple, and other forms of chopped, cut, or discontinuous fiber and the like having a regular or irregular cross-section. The term fiber also includes a plurality of any of the foregoing or a combination thereof. Fibers may also be in the form of split film or tape.

As used herein, "yarn" is a continuous strand comprised of many fibers, the same or two or more different fibers, including natural or man-made fibers. A yarn is sometimes referred to as a "tow" or an "end."

As used herein, "layer" is a body that may be rigidly or flexibly curved in three dimensions, but if laid flat in a plane, would have length and width dimensions much greater than a thickness dimension.

As used herein, "tape" is a flat, narrow, monolithic strip of material having a length greater than its width and an average cross-sectional aspect ratio, i.e., the ratio of the greatest to the smallest dimension of cross sections averaged over the length of the tape article, of at least about 3:1. The cross-section of a tape of the disclosure may be rectangular, oval, polygonal, irregular, or of any shape satisfying the width, thickness and aspect ratio requirements outlined herein. An example of a tape that is commercially available includes Tensylon® from DuPont in Wilmington, Delaware.

As used herein, "woven fabric" is any structure with a plurality of the same or two or more different types of fibers or yarns that have been interwoven. Generally, such woven fabrics are made by interlacing one set of yarns, called weft or fill yarns. The woven fabric can have essentially any weave, such as, plain weave, crowfoot weave, leno weave, mock leno weave, basket weave, satin weave, twill weave, unbalanced weaves, the like, and combinations thereof. Plain and twill weaves are the most common and preferred.

As used herein, "cover factor" means the extent (e.g., percentage) to which the area of a woven fabric is covered by yarns or fibers.

As used herein, "V50" is a standard test of ballistic performance and refers to the velocity at which 50 percent of rounds fired at a ballistic target pass through the target. Thus, higher V50 indicates better ballistic performance. V50 data provided herein was obtained according to NIJ Standard-0101.06 (law enforcement projectile testing) and MIL STD-662F (military fragment testing).

As used herein, "decitex" or "dtex" is the measure of the linear density of a fiber or yarn, specifically the mass, in grams, of 10,000 meters of fiber or yarn. "Denier" and the abbreviation "d" is 9/10 times the decitex, specifically the weight in grams of 9000 meters of yarn.

As used herein, the terms "initial tensile modulus," "tensile modulus," and "modulus" mean the modulus of elasticity as measured by ASTM D2256—Standard Test Method for Tensile Properties of Yarns by the Single-Strand Method.

As used herein, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

FIG. 1 illustrates an exemplary ballistic resistant material. The ballistic resistant material 100 comprises a stack 110 of two or more woven fabric layers 120 (e.g., $120_1$, $120_2$, $120_3$ . . . $120_n$) mechanically entangled together without nonwoven fibers or materials such that fibers 130 of the woven fabric layers 120 are mechanically entangled in the interstices of the woven fabric layers 120 to form a consolidated material without nonwoven fibers and materials. During the mechanical entanglement, some of the fibers 130 of the woven fabric layers 120 are extended in a Z-direction perpendicular to the x-y plane of the woven fabric layers 120. In some embodiments, some fibers 130 of at least one woven fabric layer 120 extend in the Z-direction into at least one other woven fabric layer 120. In some embodiments, some fibers 130 of at least one woven fabric layer 120 extend in the Z-direction into at least two other woven fabric layers 120. In some embodiments, some fibers 130 of at least one woven fabric layer 120 are mechanically entangled with some fibers 130 of at least one other woven fabric layer 120. In some embodiments, some fibers 130 of at least one woven fabric layer 120 are mechanically entangled with some fibers 130 of at least two other woven fabric layers 120.

Needle-consolidating or any method of mechanical entanglement known in the art that may be used to mechanically entangle woven fabrics without nonwoven fibers, including, but not limited to, hydroentanglement, the use of air jets (e.g., air entanglement), and the like, may be used to mechanically entangle and consolidate the stack 110 of woven fabric layers 120 without of nonwoven fibers. Such mechanical entanglement helps to secure the fibers 130 in place and prevent the stack 110 of woven fabric layers 120 from shearing apart and/or delaminating from each other. In addition, such mechanical entanglement enhances the dimensional stability and overall strength of the stack 110 of woven fabric layers 120 (e.g., mechanical entanglement increases the density of the material, thereby engaging more fibers per unit volume) while also imparting some degree of flexibility to the stack 110 of woven fabric layers 120.

The preferred method of mechanical entanglement is needle-consolidating. Needle looms are used during needle-consolidation to consolidate the stack 110 of woven fabric layers 120. Needle looms are manufactured, for example, by the firms of Oskar Dilo Maschinenfabrik K G, Eberbach/N, Germany, Ferher A G, Linz, Austria and Asselin, Elbeuf, France. During needle-consolidating, barbed needles press into the stack 110 of woven fabric layers 120 and withdraw, leaving the fibers 130 of the woven fabric layers 120 entangled.

Woven Fabric Layers

The woven fabric layers 120 may include any number of layers. In some embodiments, the woven fabric layers 120 have from about 2 to about 1000 layers, in other embodiments from about 2 to 500 layers, in other embodiments from about 2 to 100 layers, in other embodiments from about 2 to 50 layers, in other embodiments from about 2 to 25 layers, and in other embodiments from about 2 to 10 layers.

In some embodiments, each woven fabric layer 120 has a basis weight of from about 20 g/m² to about 1500 g/m², in other embodiments from about 50 g/m² to about 1000 g/m², in other embodiments from about 100 g/m² to about 800 g/m², and in other embodiments from about 130 g/m² to about 500 g/m².

Each woven fabric layer 120 may comprise yarns 140 (e.g., warp yarns 140$_a$ and weft yarns 140$_b$). In some embodiments, each woven fabric layer 120 has a plurality of yarns 140, and in other embodiments each woven fabric layer 120 has no yarns 140. In some embodiments, the yarns 140 of each woven fabric layer 120 have a linear density of from about 50 dtex to about 5600 dtex, in other embodiments from about 500 dtex to about 5000 dtex, in other embodiments from about 50 dtex to about 1500 dtex, in other embodiments from about 100 dtex to about 850 dtex, and in other embodiments from about 1000 dtex to about 3500 dtex. In some embodiments, the yarns 140 of at least one woven fabric layer 120 have a linear density from about 50 dtex to about 5600 dtex, in other embodiments from about 500 dtex to about 5000 dtex, in other embodiments from about 50 dtex to about 1500 dtex, in other embodiments from about 100 dtex to about 850 dtex, and in other embodiments from about 1000 dtex to about 3500 dtex.

In some embodiments, the yarns 140 of each woven fabric layer 120 have the same linear density, in other embodiments the yarns 140 of at least one woven fabric layer 120 have the same linear density as the yarns of another woven fabric layer 120, in other embodiments the yarns 140 of at least one woven fabric layer 120 have a different linear density than the yarns 140 of another woven fabric layer 120, and in other embodiments the yarns 140 of each woven fabric layer 120 have a different linear density. In some embodiments, the yarns 140 of at least one woven fabric layer 120 have a linear density of at least 15% greater than yarns 140 of another woven fabric layer 120, in some embodiments at least 35% greater than yarns of another woven fabric layer 120, and in some embodiments 50% greater than yarns 140 of another woven fabric layer 120. In some embodiments, the yarns 140 of one or more woven fabric layers 120 have a linear density at least 15% greater than the yarns 140 of one or more other woven fabric layers 120, in some embodiments at least 35% greater than the yarns 140 of one or more other woven fabric layers 120, and in some embodiments 50% greater than the yarns 140 of one or more other woven fabric layers 120.

In some embodiments, each woven fabric layer 120 has a yarn count in the warp from about 2 to about 39 ends per inch (5.08 to 99.06 ends per centimeter), in other embodiments from about 3 to about 24 ends per inch (7.62 to 60.96 ends per centimeter), in other embodiments from about 4 to about 18 ends per inch (10.16 to 45.72 ends per centimeter) and in other embodiments from about 18 to about 39 ends per inch (45.72 to 99.06 ends per centimeter). In some embodiments, each woven fabric layer 120 has a yarn count in the weft or fill from about 2 to about 39 ends per inch (5.08 to 99.06 ends per centimeter), in other embodiments from about 3 to about 24 ends per inch (7.62 to 60.96 ends per centimeter), in other embodiments from about 4 to about 18 ends per inch (10.16 to 45.72 ends per centimeter), and in other embodiments from about 18 to about 39 ends per inch (45.72 to 99.06 ends per centimeter).

In some embodiments, the woven fabric layers 120 are in a unidirectional configuration with yarns 140 that run in the same direction. In some embodiments, the woven fabric layers 120 are in a quasi-unidirectional configuration with yarns 140 that may be laid in more than one direction. As used herein, "unidirectional" encompasses both unidirectional and quasi-unidirectional fabric, unless the context requires otherwise.

Fibers

Each woven fabric layer 120 has a plurality of fibers 130. The fibers 130 may be made into yarns 140. The fibers 130 can be any length or texture.

In some embodiments, the fibers 130 have a tenacity of at least 10 g/dtex (11.1 grams per denier (gpd)), in other embodiments at least 15 g/dtex (16.7 grams per denier (gpd)), in other embodiments at least 30 g/dtex (33.3 grams per denier (gpd)), in other embodiments at least 35 g/dtex (38.9 grams per denier (gpd)), in other embodiments at least 40 g/dtex (44.4 grams per denier (gpd)), in other embodiments at least 50 g/dtex (55.5 grams per denier (gpd)). In some embodiments, the fibers have a tenacity of from about 10 g/dtex to about 80 g/dtex (11.1 gpd to about 33.3 gpd), in other embodiments from about 15 g/dtex to about 30 g/dtex (16.7 gpd to about 33.3 gpd), in other embodiments from about 35 g/dtex to about 50 g/dtex (38.9 gpd to about 55.5 gpd), and in other embodiments from about 40 g/dtex to about 80 g/dtex (44.4 gpd to about 88.8 gpd). In some embodiments, the fibers 130 have a tensile modulus of at least about 100 g/dtex. In other embodiments, the fibers 130 have a tensile modulus from about 150 g/dtex to about 2700 g/dtex, and in other embodiments from about 200 g/dtex to 2200 g/dtex. In some embodiments, the fibers 130 have a linear density of from about 0.1 dtex to about 5600 dtex, in other embodiments from about 0.1 dtex to about 2500 dtex, in other embodiments from about 0.1 dtex to about 1000 dtex, in other embodiments from about 0.1 dtex to about 100 dtex, and in other embodiments from about 0.5 dtex to about 25 dtex. In some embodiments, the fibers 130 have an elongation to break of from about 1 to about 550 percent, in other embodiments of from about 1 to about 125 percent, in other embodiments of from about 1 to about 10 percent, and in other embodiments of from about 2 to about 6 percent.

The fibers may be made from any polymer known in the art that produces a high-strength fiber, including, but not limited to, polyamides, polyolefins, polyazoles, or blends/mixtures thereof. In some embodiments, the fibers 130 may be aramid, polyethylene, polypropylene, polyazole, polyester, graphene, spider silk, carbon nanotubes, copolymers, multi-component fibers, and combinations thereof.

When the polymer is polyamide, aramid is preferred. As used herein, "aramid" is meant a polyamide polymer wherein at least 85% of the amide (—CONH—) linkages are attached directly to two aromatic rings. Para-aramid polymers are aramid polymers where the amide linkages are in the para-position relative to each other. One preferred para-aramid polymer is poly (paraphenylene terephthalamide) or PPD-T. Additives can be used with the aramid and, in fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Suitable aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

Other useful para-aramids include aramid copolymers resulting from the incorporation and/or substitution of other aromatic diamines and other aromatic diacid chlorides such as, for example, 2,6-naphthaloyl chloride or chloro- or dichloroterephthaloyl chloride or 3,4'-diaminodiphenylether. Another preferred para-aramid comprises aramid copolymers derived from 5(6)-amino-2-(p-aminophenyl) benz-imidazole (DAPBI), para-phenylenediamine (PPD), and terephthaloyl dichloride (TCl or T, also commonly referred to as terephthaloyl chloride); such as, for example in U.S. Pat. Publ. No. 2014/0357834, Russian Patent Application No. 2,045,586 and other such fibers provided in, for example, Sugak et al., Fibre Chemistry Vol 31, No 1, 1999; U.S. Pat. No. 4,018,735; and WO 2008/061668, and US 2014/357834-A1.

Examples of para-aramid fibers that are commercially available include Kevlar® from DuPont in Wilmington, Delaware, and Twaron® from Teijin Aramid in Arnhem, Netherlands. Examples of aramid copolymer fibers include Armos® and Rusar® from Kamenskvolokno Company in Kamensk-Shakhtinskii, Russia.

When the fibers are polyolefin, polyethylene or polypropylene is preferred. The term "polyethylene" means a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE) or ultra-high molecular weight polyethylene (UHMWPE). Preparation of polyethylene fibers is discussed in U.S. Pat. Nos. 4,478,083, 4,228,118, 4,276,348 and Japanese Patents 60-047,922, 64-008,732. High molecular weight linear polyolefin fibers are commercially available. Preparation of polyolefin fibers is discussed in U.S. Pat. No. 4,457,985. Examples of polyethylene fibers that are commercially available include Spectra® fiber by Honeywell International Inc. in Morristown, N.J., U.S.A., and Dyneema® by Koninklijke D S M N.V. in Heerlen, Netherlands.

When the fibers are polyazole, polybenzazoles and polypyridazoles are preferred. Suitable polyazoles include homopolymers and, also, copolymers. Additives can be used with the polyazoles and up to as much as 10 percent, by weight, of other polymeric material can be blended with the polyazoles. Also, copolymers can be used having as much as 10 percent or more of other monomer substituted for a monomer of the polyazoles. Suitable polyazole homopolymers and copolymers can be made by known procedures, such as those described in or derived from U.S. Pat. No. 4,533,693 (to Wolfe, et al., on Aug. 6, 1985), U.S. Pat. No. 4,703,103 (to Wolfe, et al., on Oct. 27, 1987), U.S. Pat. No. 5,089,591 (to Gregory, et al., on Feb. 18, 1992), U.S. Pat. No. 4,772,678 (Sybert, et al., on Sep. 20, 1988), U.S. Pat. No. 4,847,350 (to Harris, et al., on Aug. 11, 1992), and U.S. Pat. No. 5,276,128 (to Rosenberg, et al., on Jan. 4, 1994).

Preferred polybenzazoles are polybenzimidazoles, polybenzothiazoles, and polybenzoxazoles. If the polybenzazole is a polybenzothioazole, preferably it is poly(p-phenylene benzobisthiazole). If the polybenzazole is a polybenzoxazole, preferably it is a it is poly(p-phenylene benzobisoxazole) and more preferably the poly(p-phenylene-2,6-benzobisoxazole) called PBO.

Preferred polypyridazoles are polypyridimidazoles, polypyridothiazoles, and polypyridoxazoles. In some embodiments, the preferred polypyridazole is a polypyridobisazole. The preferred poly(pyridobisozazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures, such as those described in U.S. Pat. No. 5,674,969. Examples of paraphenylene benzobisoxazole (PBO) fibers include Zylon® (Toyobo in Osaka, Japan).

Other useful aromatic polymers include aromatic unsaturated polyesters such as polyethylene terephthalate, aromatic polyimides, aromatic polyamideimides, aromatic polyester-amideimides, aromatic polyetheramideimides and aromatic polyesterimides. Copolymers of any of the above-mentioned classes of materials can also be used.

When the fibers are polyesters, vinyl-ester and ortho-polyester resins are preferred. The vinyl-ester resin is the reaction product of an epoxy resin and an unsaturated fatty acid such as methacrylic or acrylic acid. Most preferably, epoxy resins used are of the diglycidyl ether/bisphenol-A type. Other epoxy resins such as epoxy novolac or halogenated epoxy are also preferred. An ortho-polyester is the reaction product of a glycol, an unsaturated aliphatic dibasic acid or anhydride thereof, and a saturated ortho aromatic acid or anhydride thereof. The glycol is usually propylene glycol, but other glycols such as ethylene glycol, diethylene glycol, dipropylene glycol, and the like may be used. The unsaturated dibasic acid or anhydride is usually maleic acid, fumaric acid, or maleic anhydride, but may be other similar acids or anhydrides. The ortho-aromatic acid or anhydride is preferably ortho-phthalic acid or anhydride, but can be other saturated ortho-aromatic acids and acids modified by halogenation with chlorine. Vinyl-ester resins and ortho-phthalic acid and isophthalic acid polyester resins are generally cured by reaction with monomers such as styrene or substituted styrene such as vinyl toluene or a-methyl styrene, although other monomers such as methyl methacrylate, methyl acrylate, diallyl phthalate, triallyl cyanurate, and the like.

When the fibers are graphene, multi-layers of single sheets of carbon atoms bonded together in a honeycomb pattern are preferred.

When the fibers are carbon nanotubes, they consist of single-wall carbon nanotubes with diameters in the range of a nanometer. Single-wall carbon nanotubes are one of the allotropes of carbon, intermediate between fullerene cages and flat graphene.

When the fibers are spider silk, natural silks or synthetic silks can be employed. Natural silks are protein fibers spun into silks by spiders, generally to make webs. Synthetic silks consist of fibers derived from other organisms, including, but not limited to, *Bombyx mori* silkworms, *E. coli*, goats, tobacco plants and potato plants.

Ballistic Resistant Material

The thickness and weight of the ballistic resistant material 100 may vary depending on a variety of factors, including, but not limited to, the type and number of layers of woven fabric layers 120, the degree of mechanical entanglement, the fabric structure, areal density, and weave cover factor of the woven fabric layers 120.

The ballistic resistant material 100 may be any thickness or weight. In some embodiments, the thickness of the ballistic resistant material 100 is from about 0.025 in. (0.0635 cm) to about 4.0 in. (10.06 cm), and in other embodiments from about 0.10 in. (0.254 cm) to about 2.0 in. (5.03 cm). In some embodiments, the ballistic resistant material 100 has an areal density of from about 0.034 kg/m$^2$ (0.0070 lb/ft$^2$) to about 9.8 kg/m$^2$ (2.0 lb/ft$^2$), in other embodiments from about 0.034 kg/m$^2$ (0.0070 lb/ft$^2$) to about 3.1 kg/m$^2$ (0.63 lb/ft$^2$), in other embodiments from about 0.17 kg/m$^2$ (0.035 lb/ft$^2$) to about 9.8 kg/m$^2$ (2.0 lb/ft$^2$), in other embodiments from about 0.17 kg/m$^2$ (0.035 lb/ft$^2$) to about 2.2 kg/m$^2$ (0.45 lb/ft$^2$), and in other embodiments from about 0.17 kg/m$^2$ (0.035 lb/ft$^2$) to about 0.85 kg/m$^2$ (0.17 lb/ft$^2$).

In some embodiments, the ballistic resistant material 100 has a V50 when challenged with either a 9 mm projectile according to NIJ Standard-0101.06 (law enforcement projectile testing) or a 17-grain fragment simulated projectile according to MIL STD-662F (fragment testing) in the range of from about 750 ft/s to about 3000 ft/s, in other embodiments from about 600 ft/s to about 4000 ft/s, and in other embodiments from about 500 ft/s to about 20,000 ft/s.

In addition to the performance benefit, the ballistic resistant material 100 does not require further assembly of the woven fabric layers 120. For example, if the ballistic resistant material 100 were used by a ballistic vest manufacturer to create a ballistic vest, the manufacturer may cut a unit of ballistic resistant material 100 from a single roll that has been tested to meet specific ballistic requirements. This method avoids the additional labor of cutting many layers of ballistic fabric, stacking, counting and quilting or stitching layers together. The ballistic resistant material 100 is thus a "ready-made" ballistic material, offering economic as well as performance advantages, that can then be used as a building block to create various constructions in numerous potential products for ballistic applications.

Method of Manufacturing

Figure 2:
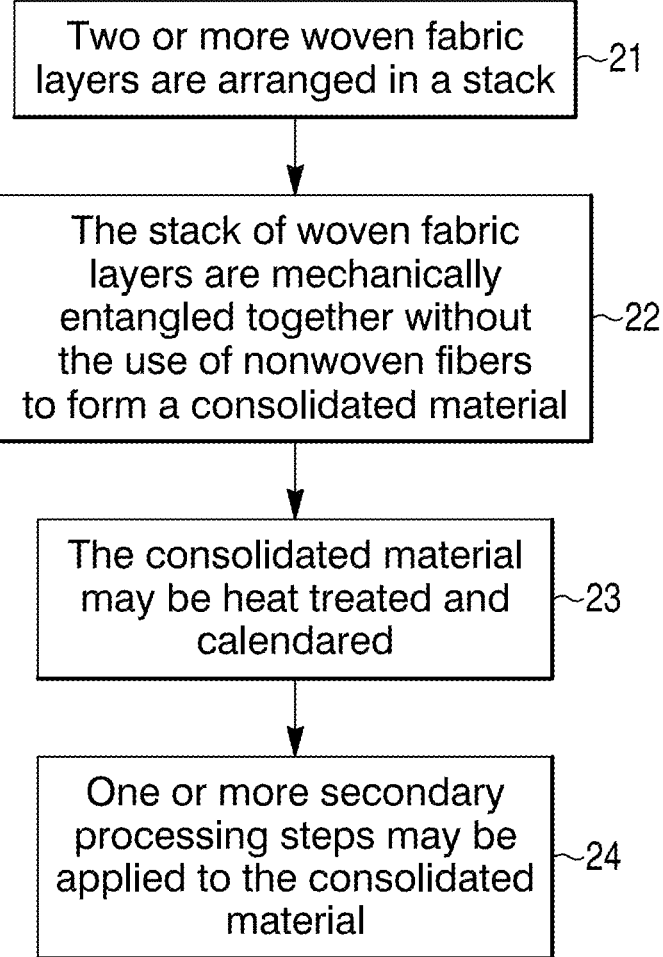
FIG. 2 is a flowchart of a method of forming a ballistic resistant material according to an exemplary embodiment.

FIG. 2 is a flow chart of an exemplary method of forming a ballistic resistant material. In step 21, two or more woven fabric layers 120 are arranged in a stack 110.

The yarns 140 of the woven fabric layers 120 are preferably cross-laid at 90-degree angles with respect to one another and held in place by lightly stitching, sewing, or interweaving lightweight yarns such that the woven fabric layers 120 remain manageable during the manufacturing processes without separating and without bending the individual tows or yarns 140.

In step 22, the stack 110 of woven fabric layers 120 is mechanically entangled together without nonwoven fibers via needle-consolidating or any method of mechanical entanglement known in the art that may be used to mechanically entangle woven fabrics without nonwoven fibers, including, but not limited to, hydroentanglement, the use of air jets (e.g., air entanglement), and the like, to form a consolidated material. Accordingly, fibers 130 of the woven fabric layers 120 are mechanically entangled in the interstices of the woven fabric layers 120 to form a consolidated material without nonwoven fibers and materials.

In step 23, the consolidated material may be heat treated and calendared. Heat treatment and calendaring are conducted to increase the density of the consolidated material. In some embodiments, the density of the consolidated material is increased from about 5% to about 55%, in other embodiments from about 8% to about 40%, and in other embodiments from about 10% to 40%.

In step 24, one or more secondary processing steps may be applied to the consolidated material. Secondary process steps may include any known in the art, including, but not limited to, the application of one or more treatments or coatings (e.g., water repellant coatings), and sewing and/or lamination of the consolidated material.

Steps 21, 22, 23, and 24 are preferably carried out in such order. However, the steps may be carried out in any order and/or in combination with another step.

Ballistic Resistant Article and Industrial Applicability

Figure 3:
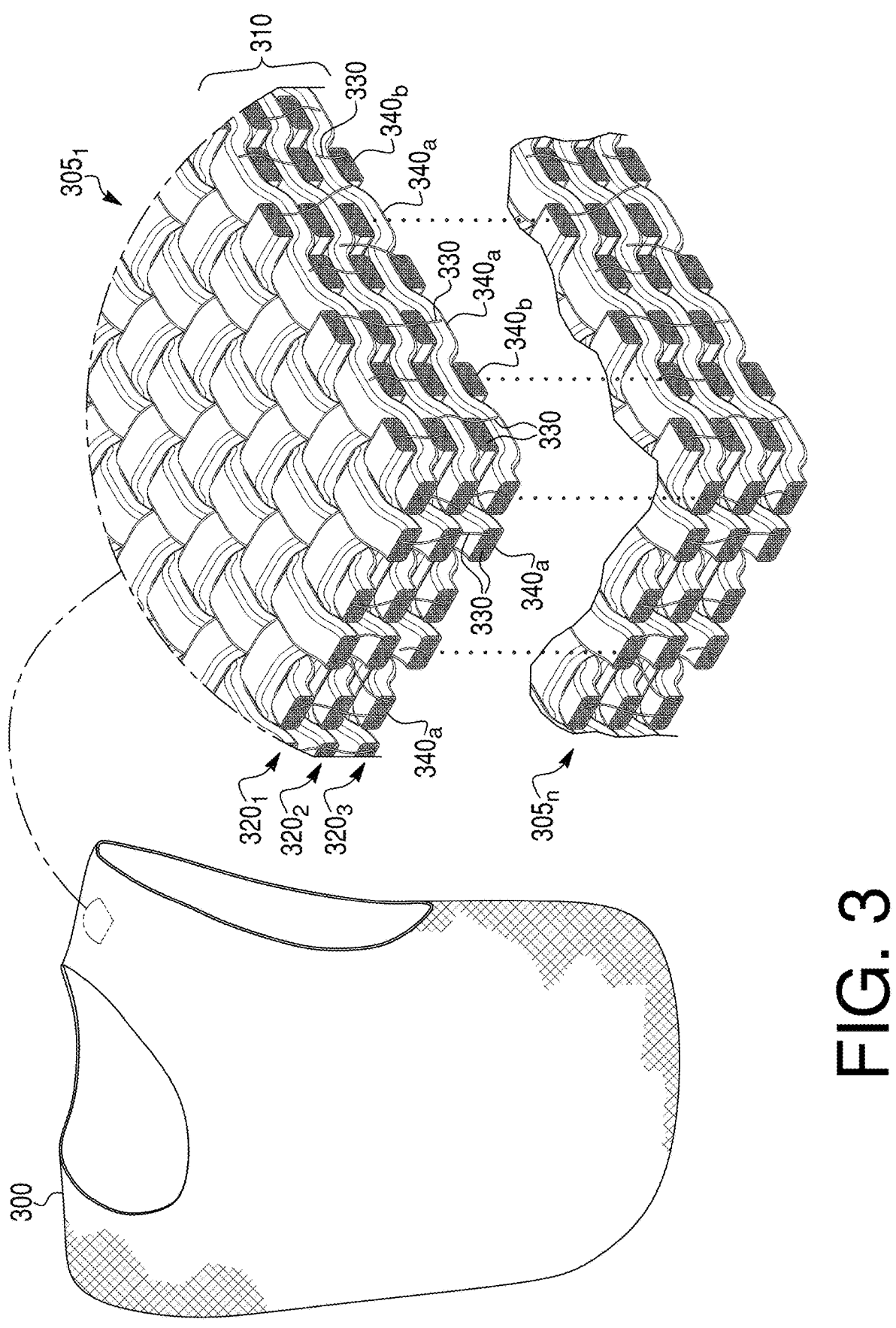
FIG. 3 is a perspective view of a ballistic resistant article according to an exemplary embodiment.

FIG. 3 illustrates an exemplary ballistic resistant article. The ballistic article 300 comprises one or more ballistic resistant materials 305 (e.g., 305$_1$ . . . 305$_n$). Each ballistic resistant material 305 comprises a stack 310 of two or more woven fabric layers 320 mechanically entangled together without nonwoven fibers or materials such that fibers 330 of the yarns 340 (e.g., warp yarns 340$_a$ and weft yarns 340$_b$) of the woven fabric layers 320 are mechanically entangled in the interstices of the woven fabric layers 320 to form a consolidated material without nonwoven fibers and materials.

The one or more ballistic resistant materials 305 may include any number of individual ballistic resistant materials. In some embodiments, the one or more ballistic resistant materials 305 includes 1 to 5 ballistic resistant materials, in other embodiments 1 to 50 ballistic resistant materials, in other embodiments 1 to 100 ballistic resistant materials, and in other embodiments 1 to 500 ballistic resistant materials.

When the one or more ballistic resistant materials 305 includes more than one ballistic resistant material (i.e., two or more), the one or more ballistic resistant materials ballistic resistant materials 305 may be mechanically bonded together by stitching or other forms of mechanical bonding that are known in the art. When such one or more ballistic resistant materials 305 are mechanically bonded together by stitching, any type of stitching known in the art may be used, including, without limitation, a plain stitch, quilt stitch, and a cross stitch.

The article and ballistic resistant material as disclosed herein are useful in a wide range of applications and may be used in any ballistic application known in the art including, but not limited to, protective apparel or body armor that protect body parts from projectiles, such as vests, jackets, etc.; hard armor or hard composite armor; hard and soft containment structures; bomb containment structures; mitigating panels; and aerial vehicles. The term "projectile" is used herein to mean a bullet or other object or fragment thereof, such as, fired from a gun.

Test Methods

The following test methods were used in the following Examples.

Linear Density: The linear density of a yarn or fiber is determined by weighing a known length of the yarn or fiber based on the procedures described in ASTM D1907-97.

Areal Density: The areal density of the fabric layer is determined by measuring the weight of each single layer of selected size, e.g., 10 cm×10 cm. The areal density of a composite structure is determined by the sum of the areal densities of the individual layers.

Ballistic Penetration Performance: Ballistic tests of the multi-layer consolidated materials were conducted according to NIJ Standard-0101.06 (projectile testing) and MIL STD-662F (military fragment testing). Four targets were tested for each example and between six to nine shots, at zero-degree obliquity, fired at each dry target. The reported V50 values are average values for the number of shots fired for each example.

EXAMPLES

The following examples are given to illustrate exemplary embodiments of the invention and should not be interpreted as limiting it in any way.

Example 1

7 woven layers of aramid copolymer fabrics (thickness 0.070" each) were stacked and subjected to needle-consolidating. The resulting consolidated material weighed about 0.19 lb/ft$^2$. The V50 of the consolidated material was then tested against a 17-grain fragment simulated projectile in accordance with MIL STD-662F. The V50 results are shown in Table 1.

Comparative Example 2

1 nonwoven layer of para-aramid fibers (thickness 0.02") was superimposed on 7 woven layers of aramid copolymer fabrics (thickness 0.070" each) to form a stack. The stack was then subjected to needle punching. The resulting consolidated material weighed about 0.21 lb/ft² (10% heavier than example 1). The V50 of the consolidated material was then tested against a 17-grain fragment simulated projectile in accordance with MIL STD-662F. The V50 results are shown in Table 1.

Example 3

7 woven layers of UHMWPE polymer fabrics (thickness 0.050" each) were stacked and subjected to needle-consolidating. The resulting consolidated material weighed about 0.15 lb/ft². The V50 of the consolidated material was then tested against a 17-grain fragment simulated projectile in accordance with MIL STD-662F. The V50 results are shown in Table 1.

Comparative Example 4

1 nonwoven layer of para-aramid fibers (thickness 0.020") was superimposed on 7 woven layers of UHMWPE polymer fabrics (thickness 0.050" each) to form a stack. The stack was then subjected to needle punching. The resulting consolidated material weighed about 0.16 lb/ft² (10% heavier than example 3). The V50 of the consolidated material was then tested against a 17-grain fragment simulated projectile in accordance with MIL STD-662F. The V50 results are shown in Table 1.

Example 5

7 woven layers of para-aramid fabrics (thickness 0.070" each) are stacked. The stack is subjected to needle-consolidating. The resulting consolidated material weighs about 0.20 lb/ft². The V50 of the consolidated material is then tested against a 17-grain fragment simulated projectile in accordance with MIL STD-662F. The V50 results are shown in Table 1.

Comparative Example 6

1 nonwoven layer of para-aramid fibers (thickness 0.020") is superimposed on 7 woven layers of para-aramid fabrics (thickness 0.070" each) to form a stack. The stack is subjected to needle punching. The resulting consolidated material weighs about 0.22 lb/ft² (10% heavier than example 7). The V50 of the consolidated material is then tested against a 17-grain fragment simulated projectile in accordance with MIL STD-662F. The V50 results are shown in Table 1.

Example 7

2 woven layers of aramid copolymer fabrics (thickness 0.070" each) are stacked. The stack is subjected to hydroentanglement by a high-pressure water stream (maximum pressure of 6.9 MPa). The resulting consolidated material weighs about 0.07 lb/ft². The V50 of the consolidated material is then tested against a 17-grain fragment simulated projectile in accordance with MIL STD-662F. The V50 results are shown in Table 1.

Comparative Example 8

1 nonwoven layer of para-aramid fibers (thickness 0.02") is superimposed on 2 woven layers of aramid copolymer fabrics (thickness 0.070" each) to form a stack. The stack is subjected to hydroentanglement by a high-pressure water stream (maximum pressure of 6.9 MPa). The resulting consolidated material weighs about 0.09 lb/ft² (10% heavier than example 7). The V50 of the consolidated material is then tested against a 17-grain fragment simulated projectile in accordance with MIL STD-662F. The V50 results are shown in Table 1.

Table 1 shows the V50 performance of the resulting consolidated materials in Example 1, 3, 5, 7 and Comparative Example 2, 4, 6, 8 using a 17-grain fragment simulated projectile in accordance with MIL STD-662F. As shown, the resulting consolidated material in Examples 1, 3, 5, and 7 exhibit similar ballistic performance at 10% lower weight when compared with Comparative Examples 2, 4, 6, and 8 respectively.

TABLE 1

| (17-grain Fragment Simulated Projectile) | | | |
|---|---|---|---|
| # of Nonwoven Layers in Consolidated Material | # of Woven Fabric Layers in Consolidated Material | Areal Density psf (lbs./sq. ft.) | V50 fps (ft./sec.) |
| Example 1 | 0 | 7 | 0.19 | 1229 |
| Comparative Example 2 | 1 | 7 | 0.21 | 1259 |
| Example 3 | 0 | 7 | 0.15 | 882 |
| Comparative Example 4 | 1 | 7 | 0.16 | 868 |
| Example 5 | 0 | 7 | 0.20 | 1025 |
| Comparative Example 6 | 1 | 7 | 0.22 | 1051 |
| Example 7 | 0 | 2 | 0.07 | 787 |
| Comparative Example 8 | 1 | 2 | 0.09 | 785 |

Example 9

3 consolidated materials were formed separately in accordance with Example 1 and stacked together. The stack of 3 consolidated materials was then corner stitched together to create a ballistic panel (shoot pack) which weighed about 0.57 lb/ft². The V50 of the ballistic panel was then tested against a 17-grain fragment simulated projectile in accordance with MIL STD-662F. The V50 results are shown in Table 2.

Comparative Example 10

3 consolidated materials were formed separately in accordance with Comparative Example 2 and stacked together. The stack of 3 consolidated materials was then corner stitched together to create a ballistic panel (shoot pack) which weighed about 0.62 lb/ft². The V50 of the ballistic panel was then tested against a 17-grain fragment simulated projectile in accordance with MIL STD-662F. The V50 results are shown in Table 2.

Example 11

10 consolidated materials are formed separately in accordance with Example 7 and stacked together. The stack of 10 consolidated materials is corner stitched together to create a ballistic panel (shoot pack) which weighs about 0.70 lb/ft². The V50 of the ballistic panel is then tested against a 17-grain fragment simulated projectile in accordance with MIL STD-662F. The V50 results are shown in Table 2.

Comparative Example 12

10 consolidated materials are formed separately in accordance with Comparative Example 8 and stacked together. The stack of 10 consolidated materials is corner stitched together to create a ballistic panel (shoot pack) which weighs about 0.90 lb/ft². The V50 of the ballistic panel is then tested against a 17-grain fragment simulated projectile in accordance with MIL STD-662F. The V50 results are shown in Table 2.

Table 2 shows the V50 performance of the resulting ballistic panels in Examples 9 and 11, and Comparative Examples 10 and 12 using a 17-grain fragment simulated projectile in accordance with MIL STD-662F. As shown, the resulting ballistic panels (shoot packs) in Examples 9 and 11 exhibit similar ballistic performance at a lower weight when compared with Comparative Examples 10 and 12, respectively.

TABLE 2

| | | | |
|---|---|---|---|
| (17-grain Fragment Simulated Projectile) | | | |
| | # of Layers of Consolidated Material | Areal Density psf (lb/ft²) | V50 fps (ft./sec.) |
| Example 9 | 3 | 0.57 | 1932 |
| Comparative Example 10 | 3 | 0.62 | 1931 |
| Example 11 | 10 | 0.70 | 2058 |
| Comparative Example 12 | 10 | 0.90 | 2069 |

The ballistic resistant material as described herein therefore is an improvement and has many advantages over mechanically entangled ballistic resistant materials with nonwoven fibers and materials including, but not limited to, being lighter in weight while having similar ballistic performance, being less susceptible to absorbing undesired liquids (e.g., water, sweat, etc.), requiring less fabric rolls to produce ballistic applications, being easier and lower in cost to manufacturer, and reducing the risk of errors in the manufacturing of ballistic applications due to less overall layers.

OTHER EMBODIMENTS OF THE PRESENT APPLICATION

Embodiment 1. In some embodiments, a consolidated material comprises: a plurality of woven fabric layers that are mechanically entangled together, wherein the plurality of woven fabric layers comprise fibers, wherein the plurality of woven fabric layers are mechanically entangled together with fibers of the plurality of woven fabric layers and without nonwoven fibers, wherein at least some fibers of the plurality of woven fabric layers extend in the Z-direction perpendicular to the x-y plane of the plurality of woven fabric layers.

Embodiment 2. The consolidated material of embodiment 1, wherein some fibers of at least one woven fabric layer of the plurality of woven fabric layers extend in the Z-direction into at least one other woven fabric layer of the plurality of woven fabric layers.

Embodiment 3. The consolidated material of any one of embodiments 1 or 2, wherein at least some fibers of one woven fabric layer of the plurality of woven fabric layers extend in the Z-direction into at least two other woven fabric layers of the plurality of woven fabric layers.

Embodiment 4. The consolidated material of any one of embodiments 1 to 3, wherein some fibers of at least one woven fabric layer of the plurality of woven fabric layers are mechanically entangled with some fibers of at least one other woven fabric layer of the plurality of woven fabric layers.

Embodiment 5. The consolidated material of any one of embodiments 1 to 4, wherein some fibers of one woven fabric layer of the plurality of woven fabric layers are mechanically entangled with some fibers of at least two other woven fabric layer of the plurality of woven fabric layers.

Embodiment 6. The consolidated material of any one of embodiments 1 to 5, wherein the plurality of woven fabric layers are mechanically entangled together by needle-consolidating.

Embodiment 7. The consolidated material of any one of embodiments 1 to 6, wherein the plurality of woven fabric layers are mechanically entangled together by hydroentanglement.

Embodiment 8. The consolidated material of any one of embodiments 1 to 7, wherein the plurality of woven fabric layers are mechanically entangled together by air entanglement.

Embodiment 9. The consolidated material of any one of embodiments 1 to 8, wherein the plurality of woven fabric layers have from about 2 to about 100 layers.

Embodiment 10. The consolidated material of embodiment 9, wherein the plurality of woven fabric layers have from about 2 to about 50 layers.

Embodiment 11. The consolidated material of embodiment 10, wherein the plurality of woven fabric layers have from about 2 to about 25 layers.

Embodiment 12. The consolidated material of embodiment 11, wherein the plurality of woven fabric layers have from about 2 to about 10 layers.

Embodiment 13. The consolidated material of any one of embodiments 1 to 12, wherein each woven fabric layer of the plurality of woven fabric layers has a basis weight of from about 20 g/m² to about 1500 g/m².

Embodiment 14. The consolidated material of embodiment 13, wherein each woven fabric layer of the plurality of woven fabric layers has a basis weight of from about 50 g/m² to about 1000 g/m².

Embodiment 15. The consolidated material of embodiment 14, wherein each woven fabric layer of the plurality of woven fabric layers has a basis weight of from about 100 g/m² to about 800 g/m².

Embodiment 16. The consolidated material of embodiment 15, wherein each woven fabric layer of the plurality of woven fabric layers has a basis weight of from about 130 g/m² to about 500 g/m².

Embodiment 17. The consolidated material of any one of embodiments 1 to 16, wherein each woven fabric layer of the plurality of woven fabric layers comprise a plurality of yarns.

Embodiment 18. The consolidated material of embodiment 17, wherein the yarns of at least one woven fabric layer of the plurality of woven fabric layers have a linear density of from about 50 dtex to about 5600 dtex.

Embodiment 19. The consolidated material of embodiment 18, wherein the yarns of at least one woven fabric layer of the plurality of woven fabric layers have a linear density of from about 50 dtex to about 1500 dtex.

Embodiment 20. The consolidated material of embodiment 19, wherein the yarns of at least one woven fabric layer of the plurality of woven fabric layers have a linear density of from about 100 dtex to about 850 dtex.

Embodiment 21. The consolidated material of embodiment 17 or 18, wherein the yarns of at least one woven fabric layer of the plurality of woven fabric layers have a linear density of from about 1000 dtex to about 3500 dtex.

Embodiment 22. The consolidated material of any one of embodiments 17 to 21, wherein the yarns of each woven fabric layer of the plurality of woven fabric layers have the same linear density.

Embodiment 23. The consolidated material of any one of embodiments 17 to 22, wherein the yarns of at least one woven fabric layer of the plurality of woven fabric layers have the same linear density as the yarns of at least one other woven fabric layer of the plurality of woven fabric layers.

Embodiment 24. The consolidated material of any one of embodiments 17 to 21, wherein the yarns of at least one woven fabric layer of the plurality of woven fabric layers have a different linear density as the yarns of at least one other woven fabric layer of the plurality of woven fabric layers.

Embodiment 25. The consolidated material of any one of embodiments 17 to 21 or 24, wherein the yarns of each woven fabric layer of the plurality of woven fabric layers have a different linear density.

Embodiment 26. The consolidated material of any one of embodiments 1 to 25, wherein the plurality of woven fabric layers are in a unidirectional configuration.

Embodiment 27. The consolidated material of any one of embodiments 1 to 25, wherein the plurality of woven fabric layers are in a quasi-unidirectional configuration.

Embodiment 28. The consolidated material of any one of embodiments 1 to 27, wherein the fibers of the plurality of woven fabric layers have a tenacity of at least 10 g/dtex.

Embodiment 29. The consolidated material of embodiment 28, wherein the fibers of the plurality of woven fabric layers have a tenacity of at least 15 g/dtex.

Embodiment 30. The consolidated material of embodiment 29, wherein the fibers of the plurality of woven fabric layers have a tenacity of at least 30 g/dtex.

Embodiment 31. The consolidated material of embodiment 30, wherein the fibers of the plurality of woven fabric layers have a tenacity of at least 40 g/dtex.

Embodiment 32. The consolidated material of embodiment 31, wherein the fibers of the plurality of woven fabric layers have a tenacity of at least 50 g/dtex.

Embodiment 33. The consolidated material of any one of embodiments 1 to 32, wherein the fibers of the plurality of woven fabric layers have a tensile modulus of at least about 100 g/dtex.

Embodiment 34. The consolidated material of any one of embodiments 1 to 33, wherein the fibers of the plurality of woven fabric layers have a tensile modulus of at least about 150 g/dtex to about 2700 g/dtex.

Embodiment 35. The consolidated material of embodiment 34, wherein the fibers of the plurality of woven fabric layers have a tensile modulus of at least about 200 g/dtex to about 2200 g/dtex.

Embodiment 36. The consolidated material of any one of embodiments 1 to 35, wherein the fibers of the plurality of woven fabric layers have a linear density of from about 0.1 dtex to about 5600 dtex.

Embodiment 37. The consolidated material of embodiment 36, wherein the fibers of the plurality of woven fabric layers have a linear density of from about 0.1 dtex to about 2500 dtex.

Embodiment 38. The consolidated material of embodiment 37, wherein the fibers of the plurality of woven fabric layers have a linear density of from about 0.1 dtex to about 1000 dtex.

Embodiment 39. The consolidated material of embodiment 38, wherein the fibers of the plurality of woven fabric layers have a linear density of from about 0.1 dtex to about 100 dtex.

Embodiment 40. The consolidated material of any one of embodiments 1 to 39, wherein the fibers of the plurality of woven fabric layers have an elongation to break of from about 1 to about 550 percent.

Embodiment 41. The consolidated material of embodiment 40, wherein the fibers of the plurality of woven fabric layers have an elongation to break of from about 1 to about 125 percent.

Embodiment 42. The consolidated material of embodiment 41, wherein the fibers of the plurality of woven fabric layers have an elongation to break of from about 1 to about 10 percent.

Embodiment 43. The consolidated material of any one of embodiments 1 to 42, wherein the fibers of the plurality of woven fabric layers are polymeric.

Embodiment 44. The consolidated material of any one of embodiments 1 to 43, wherein the fibers of the plurality of woven fabric layers comprise one or more of the following types of fibers: aramid, polyethylene, polypropylene, polyazole, polyester, graphene, spider silk, carbon nanotubes, copolymers, multi-component fibers, and combinations thereof.

Embodiment 45. The consolidated material of any one of embodiments 1 to 44, wherein the fibers of the plurality of woven fabric layers consist of one or more of the following types of fibers: aramid, polyethylene, polypropylene, polyazole, polyester, graphene, spider silk, carbon nanotubes, copolymers, multi-component fibers, and combinations thereof.

Embodiment 46. The consolidated material of any one of embodiments 1 to 45, wherein the fibers of the plurality of woven fabric layers are selected from the group consisting of aramid fibers, polyethylene fibers, polypropylene fibers, polyazole fibers, polyester fibers, graphene fibers, spider silk fibers, carbon nanotube fibers, copolymer fibers, multi-component fibers, and combinations thereof.

Embodiment 47. The consolidated material of any one of embodiments 1 to 44, wherein the fibers of the plurality of woven fabric layers comprise aramid fibers.

Embodiment 48. The consolidated material of any one of embodiments 1 to 44, 46 or 47, wherein the fibers of the plurality of woven fabric layers comprise polyethylene fibers.

Embodiment 49. The consolidated material of any one of embodiments 1 to 44, or 46 to 48, wherein the fibers of the plurality of woven fabric layers comprise copolymer fibers.

Embodiment 50. The consolidated material of any one of embodiments 1 to 44 or 46 to 49, wherein the fibers of the plurality of woven fabric layers comprise multi-component fibers.

Embodiment 51. The consolidated material of any one of embodiments 1 to 46, wherein the fibers of the plurality of woven fabric layers are polyethylene fibers.

Embodiment 52. The consolidated material of any one of embodiments 1 to 46, wherein the fibers of the plurality of woven fabric layers are copolymer fibers.

Embodiment 53. The consolidated material of any one of embodiments 1 to 46, wherein the fibers of the plurality of woven fabric layers are multi-component fibers.

Embodiment 54. The consolidated material of any one of embodiments 1 to 53, wherein the consolidated material has a thickness of from about 0.025 in. to about 4.0 in.

Embodiment 55. The consolidated material of embodiment 54, wherein the consolidated material has a thickness of from about 0.10 in. to about 2.0 in.

Embodiment 56. The consolidated material of any one of embodiments 1 to 55, wherein the consolidated material has an areal density of from about 0.034 $kg/m^2$ to about 9.8 $kg/m^2$.

Embodiment 57. The consolidated material of embodiment 56, wherein the consolidated material has an areal density of from about 0.034 $kg/m^2$ to about 3.1 $kg/m^2$.

Embodiment 58. The consolidated material of embodiment 56, wherein the consolidated material has an areal density of from about 0.17 $kg/m^2$ to about 9.8 $kg/m^2$.

Embodiment 59. The consolidated material of embodiment 58, wherein the consolidated material has an areal density of from about 0.17 $kg/m^2$ to about 2.2 $kg/m^2$.

Embodiment 60. The consolidated material of embodiment 59, wherein the consolidated material has an areal density of from about 0.17 $kg/m^2$ to about 0.85 $kg/m^2$.

Embodiment 61. The consolidated material of any one of embodiments 1 to 60, wherein the consolidated material has a V50 in accordance with MIL STD-662F of from about 750 ft/s to about 3000 ft/s.

Embodiment 62. The consolidated material of any one of embodiments 1 to 61, wherein the consolidated material has a V50 in accordance with MIL STD-662F of from about 600 ft/s to about 4000 ft/s.

Embodiment 63. The consolidated material of any one of embodiments 1 to 62, wherein the consolidated material has a V50 in accordance with MIL STD-662F of from about 500 ft/s to about 20000 ft/s.

Embodiment 64. An article comprising at least one consolidated material of any one of embodiments 1 to 63.

Embodiment 65. A ballistic resistant article comprising at least one consolidated material of any one of embodiments 1 to 63.

Embodiment 66. The ballistic resistant article of embodiment 65, wherein the ballistic resistant article comprises 1 to 5 consolidated materials.

Embodiment 67. The ballistic resistant article of embodiment 65, wherein the ballistic resistant article comprises 1 to 50 consolidated materials.

Embodiment 68. The ballistic resistant article of embodiment 65, wherein the ballistic resistant article comprises 1 to 100 consolidated materials.

Embodiment 69. In some embodiments, a consolidated material comprises: two or more woven fabric layers that are mechanically entangled together without nonwoven fibers, wherein some fibers of at least one woven fabric layer of the two or more woven fabric layers extend in the Z-direction into at least one other woven fabric layer of the two or more woven fabric layers.

Embodiment 70. In some embodiments, a method of forming a consolidated material comprises: mechanically entangling two or more woven fabric layers together without the use of nonwoven fibers to form a consolidated material.

Embodiment 71. The method of embodiment 70, further comprising arranging the two or more woven fabric layers in a stack prior to mechanically entangling the two or more woven fabric layers.

Embodiment 72. The method of any one of embodiments 70 or 71, further comprising heat treating and calendaring the consolidated material.

Embodiment 73. The method of any one of embodiments 70 to 72, further comprising applying one or more secondary processing steps to the consolidated material.

Embodiment 74. In some embodiments, a method of forming a consolidated material comprises: mechanically entangling a plurality of woven fabric layers together to form a consolidated material, wherein the plurality of woven fabric layers comprise fibers, wherein the plurality of woven fabric layers are mechanically entangled together with fibers of the plurality of woven fabric layers and without nonwoven fibers, wherein at least some fibers of the plurality of woven fabric layers extend in the Z-direction perpendicular to the x-y plane of the plurality of woven fabric layers.

Embodiment 75. The method of embodiment 74, further comprising arranging the plurality of woven fabric layers together in a stack prior to mechanically entangling the plurality of woven fabric layers together.

Embodiment 76. The method of any one of embodiments 74 or 75, further comprising heat treating and calendaring the consolidated material.

Embodiment 77. The method of any one of embodiments 74 to 76, further comprising applying one or more secondary processing steps to the consolidated material.

Embodiment 78. The method of any one of embodiments 74 to 77, wherein some fibers of at least one woven fabric layer of the plurality of woven fabric layers extend in the Z-direction into at least one other woven fabric layer of the plurality of woven fabric layers.

Embodiment 79. The method of any one of embodiments 74 to 78, wherein at least some fibers of one woven fabric layer of the plurality of woven fabric layers extend in the Z-direction into at least two other woven fabric layers of the plurality of woven fabric layers.

Embodiment 80. The method of any one of embodiments 74 to 79, wherein some fibers of at least one woven fabric layer of the plurality of woven fabric layers are mechanically entangled with some fibers of at least one other woven fabric layer of the plurality of woven fabric layers.

Embodiment 81. The method of any one of embodiments 74 to 80, wherein some fibers of one woven fabric layer of the plurality of woven fabric layers are mechanically entangled with some fibers of at least two other woven fabric layer of the plurality of woven fabric layers.

Embodiment 82. The method of any one of embodiments 74 to 81, wherein the plurality of woven fabric layers are mechanically entangled together by needle-consolidating.

Embodiment 83. The method of any one of embodiments 74 to 82, wherein the plurality of woven fabric layers are mechanically entangled together by hydroentanglement.

Embodiment 84. The method of any one of embodiments 74 to 83, wherein the plurality of woven fabric layers are mechanically entangled together by air entanglement.

Embodiment 85. The method of any one of embodiments 74 to 84, wherein the plurality of woven fabric layers have from about 2 to about 100 layers.

Embodiment 86. The method of embodiment 85, wherein the plurality of woven fabric layers have from about 2 to about 50 layers.

Embodiment 87. The method of embodiment 86, wherein the plurality of woven fabric layers have from about 2 to about 25 layers.

Embodiment 88. The method of embodiment 87, wherein the plurality of woven fabric layers have from about 2 to about 10 layers.

Embodiment 89. The method of any one of embodiments 74 to 88, wherein each woven fabric layer of the plurality of woven fabric layers has a basis weight of from about 20 $g/m^2$ to about 1500 $g/m^2$.

Embodiment 90. The method of embodiment 89, wherein each woven fabric layer of the plurality of woven fabric layers has a basis weight of from about 50 $g/m^2$ to about 1000 $g/m^2$.

Embodiment 91. The method of embodiment 90, wherein each woven fabric layer of the plurality of woven fabric layers has a basis weight of from about 100 $g/m^2$ to about 800 $g/m^2$.

Embodiment 92. The method of embodiment 91, wherein each woven fabric layer of the plurality of woven fabric layers has a basis weight of from about 130 $g/m^2$ to about 500 $g/m^2$.

Embodiment 93. The method of any one of embodiments 74 to 92, wherein each woven fabric layer of the plurality of woven fabric layers comprise a plurality of yarns.

Embodiment 94. The method of embodiment 93, wherein the yarns of at least one woven fabric layer of the plurality of woven fabric layers have a linear density of from about 50 dtex to about 5600 dtex.

Embodiment 95. The method of embodiment 94, wherein the yarns of at least one woven fabric layer of the plurality of woven fabric layers have a linear density of from about 50 dtex to about 1500 dtex.

Embodiment 96. The method of embodiment 95, wherein the yarns of at least one woven fabric layer of the plurality of woven fabric layers have a linear density of from about 100 dtex to about 850 dtex.

Embodiment 97. The method of any one of embodiments 93 or 94, wherein the yarns of at least one woven fabric layer of the plurality of woven fabric layers have a linear density of from about 1000 dtex to about 3500 dtex.

Embodiment 98. The method of any one of embodiments 93 to 97, wherein the yarns of each woven fabric layer of the plurality of woven fabric layers have the same linear density.

Embodiment 99. The method of any one of embodiments 93 to 98, wherein the yarns of at least one woven fabric layer of the plurality of woven fabric layers have the same linear density as the yarns of at least one other woven fabric layer of the plurality of woven fabric layers.

Embodiment 100. The method of any one of embodiments 93 to 97, wherein the yarns of at least one woven fabric layer of the plurality of woven fabric layers have a different linear density as the yarns of at least one other woven fabric layer of the plurality of woven fabric layers.

Embodiment 101. The method of embodiment 100, wherein the yarns of each woven fabric layer of the plurality of woven fabric layers have a different linear density.

Embodiment 102. The method of any one of embodiments 74 to 101, wherein the plurality of woven fabric layers are in a unidirectional configuration.

Embodiment 103. The method of any one of embodiments 74 to 101, wherein the plurality of woven fabric layers are in a quasi-unidirectional configuration.

Embodiment 104. The method of any one of embodiments 74 to 103, wherein the fibers of the plurality of woven fabric layers have a tenacity of at least 10 g/dtex.

Embodiment 105. The method of embodiment 104, wherein the fibers of the plurality of woven fabric layers have a tenacity of at least 15 g/dtex.

Embodiment 106. The method of embodiment 105, wherein the fibers of the plurality of woven fabric layers have a tenacity of at least 30 g/dtex.

Embodiment 107. The method of embodiment 106, wherein the fibers of the plurality of woven fabric layers have a tenacity of at least 40 g/dtex.

Embodiment 108. The method of embodiment 107, wherein the fibers of the plurality of woven fabric layers have a tenacity of at least 50 g/dtex.

Embodiment 109. The method of any one of embodiments 74 to 108, wherein the fibers of the plurality of woven fabric layers have a tensile modulus of at least about 100 g/dtex.

Embodiment 110. The method of embodiment 109, wherein the fibers of the plurality of woven fabric layers have a tensile modulus of at least about 150 g/dtex to about 2700 g/dtex.

Embodiment 111. The method of embodiment 110, wherein the fibers of the plurality of woven fabric layers have a tensile modulus of at least about 200 g/dtex to about 2200 g/dtex.

Embodiment 112. The method of any one of embodiments 74 to 111, wherein the fibers of the plurality of woven fabric layers have a linear density of from about 0.1 dtex to about 5600 dtex.

Embodiment 113. The method of embodiment 112, wherein the fibers of the plurality of woven fabric layers have a linear density of from about 0.1 dtex to about 2500 dtex.

Embodiment 114. The method of embodiment 113, wherein the fibers of the plurality of woven fabric layers have a linear density of from about 0.1 dtex to about 1000 dtex.

Embodiment 115. The method of embodiment 114, wherein the fibers of the plurality of woven fabric layers have a linear density of from about 0.1 dtex to about 100 dtex.

Embodiment 116. The method of any one of embodiments 74 to 115, wherein the fibers of the plurality of woven fabric layers have an elongation to break of from about 1 to about 550 percent.

Embodiment 117. The method of embodiment 116, wherein the fibers of the plurality of woven fabric layers have an elongation to break of from about 1 to about 125 percent.

Embodiment 118. The method of embodiment 117, wherein the fibers of the plurality of woven fabric layers have an elongation to break of from about 1 to about 10 percent.

Embodiment 119. The method of any one of embodiments 74 to 118, wherein the fibers of the plurality of woven fabric layers are polymeric.

Embodiment 120. The method of any one of embodiments 74 to 119, wherein the fibers of the plurality of woven fabric layers comprise one or more of the following types of fibers: aramid, polyethylene, polypropylene, polyazole, polyester, graphene, spider silk, carbon nanotubes, copolymers, multi-component fibers, and combinations thereof.

Embodiment 121. The method of any one of embodiments 74 to 120, wherein the fibers of the plurality of woven fabric layers consist of one or more of the following types of fibers: aramid, polyethylene, polypropylene, polyazole, polyester, graphene, spider silk, carbon nanotubes, copolymers, multi-component fibers, and combinations thereof.

Embodiment 122. The method of any one of embodiments 74 to 121, wherein the fibers of the plurality of woven fabric layers are selected from the group consisting of aramid fibers, polyethylene fibers, polypropylene fibers, polyazole fibers, polyester fibers, graphene fibers, spider silk fibers, carbon nanotube fibers, copolymer fibers, multi-component fibers, and combinations thereof.

Embodiment 123. The method of any one of embodiments 74 to 120, wherein the fibers of the plurality of woven fabric layers comprise aramid fibers.

Embodiment 124. The method of any one of embodiments 74 to 120 or 123, wherein the fibers of the plurality of woven fabric layers comprise polyethylene fibers.

Embodiment 125. The method of any one of embodiments 74 to 120, 123 or 124, wherein the fibers of the plurality of woven fabric layers comprise copolymer fibers.

Embodiment 126. The method of any one of embodiments 74 to 120, or 123 to 125, wherein the fibers of the plurality of woven fabric layers comprise multi-component fibers.

Embodiment 127. The method of any one of embodiments 74 to 121, wherein the fibers of the plurality of woven fabric layers are polyethylene fibers.

Embodiment 128. The method of any one of embodiments 74 to 121, wherein the fibers of the plurality of woven fabric layers are copolymer fibers.

Embodiment 129. The method of any one of embodiments 74 to 121, wherein the fibers of the plurality of woven fabric layers are multi-component fibers.

Embodiment 130. The method of any one of embodiments 74 to 129, wherein the consolidated material has a thickness of from about 0.025 in. to about 4.0 in.

Embodiment 131. The method of embodiment 130, wherein the consolidated material has a thickness of from about 0.10 in. to about 2.0 in.

Embodiment 132. The method of any one of embodiments 74 to 131, wherein the consolidated material has an areal density of from about 0.034 kg/m² to about 9.8 kg/m².

Embodiment 133. The method of embodiment 132, wherein the consolidated material has an areal density of from about 0.034 kg/m² to about 3.1 kg/m².

Embodiment 134. The method of any one of embodiments 74 to 132, wherein the consolidated material has an areal density of from about 0.17 kg/m² to about 9.8 kg/m².

Embodiment 135. The method of embodiment 134, wherein the consolidated material has an areal density of from about 0.17 kg/m² to about 2.2 kg/m².

Embodiment 136. The method of embodiment 135, wherein the consolidated material has an areal density of from about 0.17 kg/m² to about 0.85 kg/m².

Embodiment 137. The method of any one of embodiments 74 to 136, wherein the consolidated material has a V50 in accordance with MIL STD-662F of from about 750 ft/s to about 3000 ft/s.

Embodiment 138. The method of any one of embodiments 74 to 136, wherein the consolidated material has a V50 in accordance with MIL STD-662F of from about 600 ft/s to about 4000 ft/s.

Embodiment 139. The method of any one of embodiments 74 to 136, wherein the consolidated material has a V50 in accordance with MIL STD-662F of from about 500 ft/s to about 20000 ft/s.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, it should be appreciated that, while the invention has been described with reference to the above exemplary embodiments, other embodiments are within the scope of the claims. Moreover, it should be understood that the exemplary embodiments described herein may be combined to form other embodiments. After reading the above description, it will be apparent to one skilled in the relevant art(s) how to implement the invention in alternative embodiments. Thus, the present invention should not be limited by any of the above-described exemplary embodiments.

What is claimed as new and desired to be protected by Letters Patent of the United States is:

1. A consolidated material comprising:
   a plurality of woven fabric layers that are mechanically entangled together,
   wherein the plurality of woven fabric layers comprise fibers,
   wherein the plurality of woven fabric layers are mechanically entangled together with fibers of the plurality of woven fabric layers and without nonwoven fibers,
   wherein at least some fibers of the plurality of woven fabric layers extend in the Z-direction perpendicular to the x-y plane of the plurality of woven fabric layers,
   wherein the consolidated material has a thickness of from about 0.10 in. to about 2.0 in.,
   wherein the consolidated material has a V50 in accordance with MIL STD-662F of from about 500 ft/s to about 20000 ft/s, and
   wherein some fibers of at least one woven fabric layer of the plurality of woven fabric layers extend in the Z-direction into at least one other woven fabric layer of the plurality of woven fabric layers.

2. The consolidated material of claim 1, wherein the consolidated material has a V50 in accordance with MIL STD-662F of from about 600 ft/s to about 4000 ft/s.

3. The consolidated material of claim 1, wherein at least some fibers of one woven fabric layer of the plurality of woven fabric layers extend in the Z-direction into at least two other woven fabric layers of the plurality of woven fabric layers.

4. The consolidated material of claim 1, wherein the plurality of woven fabric layers are mechanically entangled together by needle-consolidating.

5. The consolidated material of claim 1, wherein the plurality of woven fabric layers are mechanically entangled together by hydroentanglement.

6. The consolidated material of claim 1, wherein the plurality of woven fabric layers are mechanically entangled together by air entanglement.

7. The consolidated material of claim 1, wherein the plurality of woven fabric layers have from about 2 to about 50 layers.

8. The consolidated material of claim 1, wherein each woven fabric layer of the plurality of woven fabric layers has a basis weight of from about 20 g/m² to about 1500 g/m².

9. The consolidated material of claim 1, wherein the fibers of the plurality of woven fabric layers have a tenacity of at least 10 g/dtex.

10. The consolidated material of claim 1, wherein the fibers of the plurality of woven fabric layers have a tensile modulus of at least about 100 g/dtex.

11. The consolidated material of claim 1, wherein the fibers of the plurality of woven fabric layers have an elongation to break of from about 1 to about 550 percent.

12. The consolidated material of claim 1, wherein the fibers of the plurality of woven fabric layers are polymeric.

13. The consolidated material of claim 1, wherein the fibers of the plurality of woven fabric layers comprise one or more of the following types of fibers: aramid, polyethylene, polypropylene, polyazole, polyester, graphene, spider silk, carbon nanotubes, copolymers, multi-component fibers, and combinations thereof.

14. The consolidated material of claim 1, wherein the consolidated material has an areal density of from about $0.034 \text{ kg/m}^2$ to about $9.8 \text{ kg/m}^2$.

15. The consolidated material of claim 1, wherein the fibers of the plurality of woven fabric layers form yarns that are cross-laid at 90-degree angles with respect to one another.

16. An article comprising at least one consolidated material of claim 1.

17. The article of claim 16, wherein the article is a ballistic resistant article not comprising a consolidated material with nonwoven fibers.

* * * * *